(12) United States Patent
Lau et al.

(10) Patent No.: US 11,341,547 B1
(45) Date of Patent: May 24, 2022

(54) REAL-TIME DETECTION OF DUPLICATE DATA RECORDS

(71) Applicant: Amazon Technologies, Inc., Seattle, WA (US)

(72) Inventors: Stephen Lau, Bellevue, WA (US); Ahmed Salim Ngouh Njikam, Everett, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 72 days.

(21) Appl. No.: 16/446,227

(22) Filed: Jun. 19, 2019

(51) Int. Cl.
*G06Q 30/04* (2012.01)
*G06N 20/00* (2019.01)
*G06F 16/215* (2019.01)

(52) U.S. Cl.
CPC ........ *G06Q 30/04* (2013.01); *G06F 16/215* (2019.01); *G06N 20/00* (2019.01)

(58) Field of Classification Search
CPC ........ G06Q 20/10; G06Q 20/00; G06Q 99/00; G06Q 40/00; G06Q 50/18; G06Q 30/00; G06Q 10/08; G06F 17/00; G06F 17/30
USPC ............... 705/26.1, 7.28, 24, 40, 39, 30, 35; 707/722, 723
See application file for complete search history.

(56) References Cited

U.S. PATENT DOCUMENTS

| | | | | |
|---|---|---|---|---|
| 6,882,986 B1 * | 4/2005 | Heinemann | ............ | G06Q 20/10 705/24 |
| 7,194,471 B1 * | 3/2007 | Nagatsuka | ............ | G06F 16/355 |
| 2001/0047332 A1 * | 11/2001 | Gonen-Friedman | ... | G06Q 40/12 705/40 |
| 2003/0182206 A1 * | 9/2003 | Hendrix | ............ | G06Q 30/0601 705/26.1 |
| 2003/0212520 A1 * | 11/2003 | Campos | ............... | G06K 9/6223 702/101 |
| 2005/0075960 A1 * | 4/2005 | Leavitt | ............... | G06Q 20/0457 705/35 |
| 2005/0165681 A1 * | 7/2005 | Heinemann | ............ | G06Q 20/40 705/40 |
| 2006/0095372 A1 * | 5/2006 | Venkatasubramanian | .................... | G06Q 20/102 705/40 |
| 2009/0028437 A1 * | 1/2009 | Hirohata | ................. | G06V 10/28 382/201 |
| 2010/0250405 A1 * | 9/2010 | DeWitt | .................. | G06Q 10/10 705/30 |
| 2011/0131120 A1 * | 6/2011 | Sciuk | ............. | G06Q 10/063112 705/34 |
| 2012/0278266 A1 * | 11/2012 | Naslund | .................. | G06F 16/93 706/45 |

(Continued)

*Primary Examiner* — Olusegun Goyea
(74) *Attorney, Agent, or Firm* — Thomas Horstemeyer, LLP (57) ABSTRACT

Disclosed are various embodiments for real-time detection of duplicate data records. A duplicate detection application generates a set of clusters from a set of data records by grouping each data record in the set of data records according to similarity to respective centroid data records of the set of clusters. The duplicate detection application determines whether a particular data record has a potential duplicate in the set of data records by first comparing the particular data record to the respective centroid data records to identify a most similar cluster in the set of clusters. The duplicate detection application then compares the particular data record to each data record in the most similar cluster.

20 Claims, 6 Drawing Sheets

(56) References Cited

U.S. PATENT DOCUMENTS

| | | | | |
|---|---|---|---|---|
| 2013/0212090 A1* | 8/2013 | Sperling | ............... | G06F 16/93 |
| | | | | 707/723 |
| 2013/0226798 A1* | 8/2013 | Orttung | ............... | G06Q 20/102 |
| | | | | 705/44 |
| 2013/0304639 A1* | 11/2013 | Acsay | ............... | G06Q 30/04 |
| | | | | 705/40 |
| 2014/0032427 A1* | 1/2014 | Gannon | ............... | G06Q 50/182 |
| | | | | 705/309 |
| 2015/0012422 A1* | 1/2015 | Ceribelli | ............. | G06Q 20/042 |
| | | | | 705/40 |
| 2015/0324715 A1* | 11/2015 | Nelson | ............... | G06Q 10/06 |
| | | | | 705/7.28 |

* cited by examiner

REAL-TIME DETECTION OF DUPLICATE DATA RECORDS

BACKGROUND

Enterprises, governments, organizations, and other parties may have a system to receive vendor invoices electronically. The system may evaluate the invoices and approve payment automatically. Sometimes vendors may submit duplicate invoices through the system inadvertently. The duplicate may be identical or may differ in some way. As an example, two invoices may cover the same goods and services but differ in a purchase order number. As another example, a later invoice may include goods and services not invoiced previously but also in combination with goods and services included in a past invoice. For entities receiving millions of invoices, it is impractical to review every invoice manually for duplication, and such manual review would also unacceptably slow invoice payment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to real-time detection of duplicate data records. For entities that receive thousands to millions of invoices, automated electronic processing and remittance for invoices is important in order to meet payment deadlines. However, some quantity of those invoices will be duplicates submitted by mistake, and detection of those duplicates can be a difficult problem in a large set of invoices. For example, traditional duplicate detection would involve comparing the information of a newly received invoice with the information from every invoice received within a time period, such as the past year. Such a comparison is considered computationally complex, involving a number of comparisons that grows exponentially as the data set grows.

For large data sets, it is simply impractical to perform these comparisons in real-time. Instead, batch processing may be employed such that the necessary comparisons are performed overnight on each of the previous day's invoices. Nonetheless, batch processing may be problematic as it can delay payment of an invoice potentially more than twenty-four hours. Entities that operate globally may see additional delays in time zones that are offset from the principal time zone that defines the daylong window.

Various embodiments of the present disclosure introduce a real-time system for detecting duplicate invoices or other electronic data records. Initially, invoices over a time period, such as a year, are grouped into a number of clusters according to similarity to a centroid of the cluster. As an invoice is processed, a most similar cluster is determined by comparison of the invoice to the cluster centroids. Next, the invoice is compared to each of the members of the cluster to identify any duplicate invoices. The number of clusters is configurable, and once the clusters are generated, comparisons are required only between the invoice and the cluster centroids and the members of the most similar cluster. As a consequence, the number of invoices to be compared is greatly reduced, and the duplicate detection can be performed in real-time.

Although invoice duplicate detection is used herein as an illustrative example, it is understood that the principles of the present disclosure may be used to detect duplicate data records of many types. Such data records may include, but are not limited to, social media profiles, contacts, customers, contest entries, and other data records that may include duplicates where only a singular record should be present, or where any duplicates should be grouped together. Such duplicates may arise mistakenly or intentionally, possibly through malicious behavior. As an example, an individual may enter a contest multiple times, when the rules specify that contest entry is limited to once per individual. As another example, a malicious user may create a duplicate social network profile of a target in order to deceptively obtain information from the target's circle of friends on the social network.

As one skilled in the art will appreciate in light of this disclosure, certain embodiments may be capable of achieving certain advantages, including some or all of the following: (1) reducing computer system processor and memory requirements by reducing the computational requirements for duplicate data record detection, (2) improving the functioning of the computer by providing real-time duplicate detection results, (3) improving the functioning of the computer by avoiding delays in data processing in systems that rely upon duplicate detection results, and so forth. In the following discussion, a general description of the system and its components is provided, followed by a discussion of the operation of the same.

Figure 1:
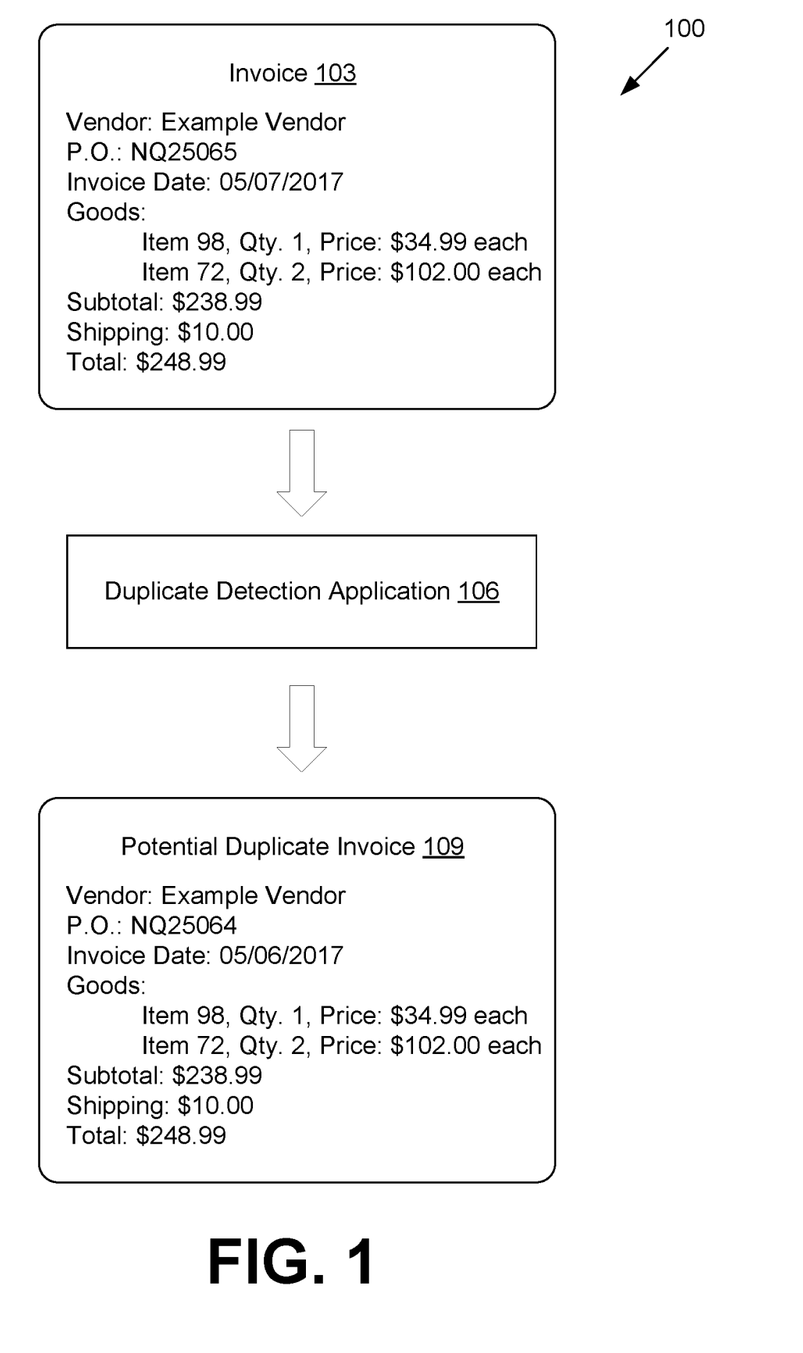
FIG. 1 is a drawing of an example scenario involving duplicate detection according to various embodiments of the present disclosure.

Referring now to FIG. 1, shown is an example scenario 100 involving real-time detection of a duplicate data record. In the example scenario 100, an invoice 103 is received by a duplicate detection application 106. The duplicate detection application 106 compares the information in the invoice 103 to identify a cluster of invoices that are similar. The duplicate detection application 106 then performs a pairwise comparison between the information in the invoice 103 and the invoices in that cluster to identify the potential duplicate invoice 109.

The potential duplicate invoice 109 in this example contains information that is similar to, but not identical to, the information in the invoice 103. For example, the vendor name, the goods listing, the subtotal amount, the shipping amount, and the total amount are identical between the invoice 103 and the potential duplicate invoice 109. However, the purchase order number and the invoice date differ between the invoice 103 and the potential duplicate invoice 109. Thus, the probability that the potential duplicate invoice 109 is in fact a duplicate may be less than 100%.

In looking at the differences between the invoice 103 and the potential duplicate invoice 109, the duplicate detection application 106 may assign a relatively high confidence score or probability to the potential duplicate invoice 109. This determination is made in view of the similarities between the differing features of the invoice 103 and the potential duplicate invoice 109. For example, the purchase order numbers may differ only in one digit, and the invoice 103 may be dated the day after the potential duplicate invoice 109.

It may be less likely that the potential duplicate invoice 109 would be a duplicate if, for instance, the potential duplicate invoice 109 were eleven months older than the invoice 103. In such a situation, the invoice 103 may represent merely a re-order of the goods from the potential duplicate invoice 109. As will be discussed, manual review and machine learning may be used to improve the accuracy of the duplicate detection application 106.

Figure 2:
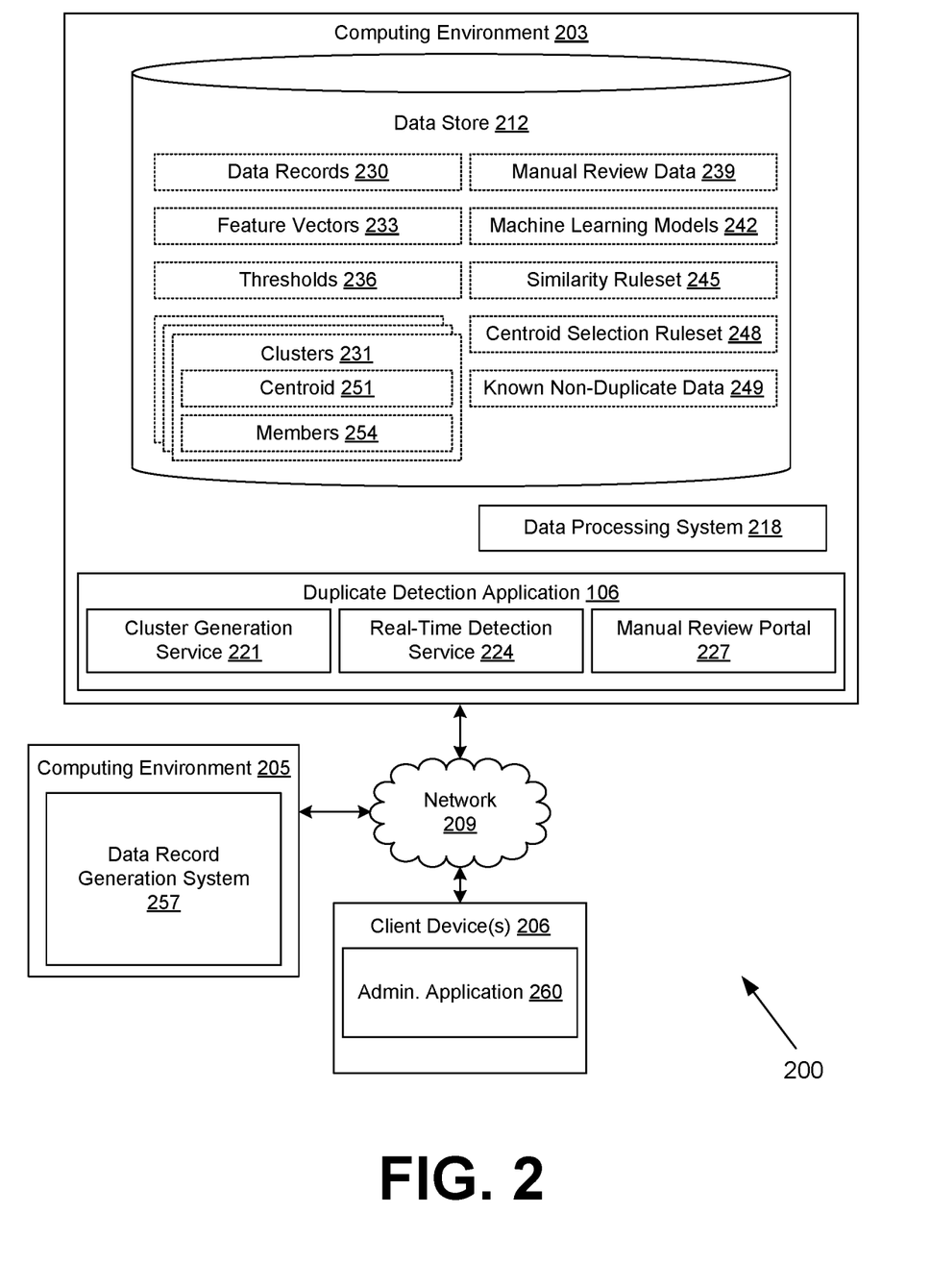
FIG. 2 is a schematic block diagram of a networked environment according to various embodiments of the present disclosure.

With reference to FIG. 2, shown is a networked environment 200 according to various embodiments. The networked environment 200 includes a computing environment 203, a computing environment 205, and one or more client devices 206, which are in data communication via a network 209. The network 209 may include, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a duplicate detection application 106, a data processing system 218, and other applications, services, processes, systems, engines, or functionality not discussed in detail herein. The duplicate detection application 106 is executed to identify, in real-time, potential duplicates of a given data record in a set of pre-existing data records. To this end, the duplicate detection application 106 may include several components, including a cluster generation service 221, a real-time detection service 224, a manual review portal 227, and/or other components.

The cluster generation service 221 is executed to generate a set of clusters for a set of data records. The cluster generation service 221 may be executed as a batch process periodically, e.g., nightly, weekly, or at some other frequency. The cluster generation service 221 may be executed periodically to account for changes in the set of data records such as the expiration or removal of data records that no longer need to be considered, e.g., over one year old, and to optimize cluster generation in view of new data records that have been received since the last update.

The real-time detection service 224 is executed to determine, for a newly received or generated data record, whether the data record is likely to be a duplicate of another data record in the previously existing set of data records. The manual review portal 227 is executed to facilitate manual review of the determination by the real-time detection service 224. For example, an administrative user can mark a data record as being a confirmed duplicate. Alternatively, an administrative user can mark a data record as not being a duplicate of another, thereby overriding a determination of the real-time detection service 224.

The data processing system 218 is executed to perform some processing on the data records 230, such that the processing should not be performed if a data record 230 is a duplicate. As an example, where the data records 230 are electronic invoices, the data processing system 218 may initiate payment remittance for the electronic invoices. As another example, where the data records 230 are contest entries, the data processing system 218 may select a winner of the contest.

The data stored in the data store 212 includes, for example, data records 230, clusters 231, feature vectors 233, thresholds 236, manual review data 239, machine learning models 242, a similarity ruleset 245, a centroid selection ruleset 248, known non-duplicate data 249, and potentially other data. The data records 230 correspond to invoices, social network profiles, customers, contest entries, and so forth, which are generated through potentially unreliable systems such that the data records 230 may contain duplicates.

As understood herein, a duplicate data record 230 may differ from another data record 230 in some respect, but to maintain integrity of the data records 230, should not be processed or acted upon. For example, a duplicate invoice from a vendor for the same goods or services should not be paid when the original invoice has been paid. Otherwise, the vendor would be paid twice for the same goods or services.

The data records 230 may correspond to a standardized database schema with a particular set of columns or features. Particular data records 230 may be imported from other schema with a mapping of columns or features as appropriate. The data records 230 may conform to various standards such as Universal Business Language (UBL), United Nations/Electronic Data Interchange for Administration, Commerce and Transport (EDIFACT), and/or other standards. In one implementation, the data records 230 may be automatically managed by the underlying data store 212 to exclude or purge data records 230 that are no longer relevant, such as data records 230 that meet an age threshold or other criteria.

The clusters 231 are periodically generated to segment the set of data records 230 into smaller subsets, thereby allowing for fewer comparisons for real-time duplicate detection. As a non-limiting example, the number of clusters 231 may be on the order of one-thousandth the number of data records 230 or smaller. Increasing the number of clusters 231 may reduce the number of data records 230 to be examined, with the trade-off of a potential loss of precision. For example, with more clusters 231 that are smaller, duplicates may be more likely not to be clustered together. Likewise, decreasing the number of clusters 231 may increase the number of data records 230 to be examined, increasing the computational requirements and reducing the benefit of using clustering. An optimized number of clusters 231 may be determined through machine learning. Alternatively, the number of clusters 231 may be manually set in view of empirical observations and trade-offs.

Each of the clusters 231 includes a data record 230 corresponding to a centroid 251 and data records 230 that are members 254 that are similar to the centroid 251. The centroid 251 is selected initially based on criteria, and the cluster 231 is built around the centroid 251 based on similarity of the members 254 to the centroid 251. For example, the feature vector 233 of a data record 230 to be assigned is compared to the feature vectors 233 of all centroids 251 to determine which centroid 251 is most similar, and therefore, which cluster 231 that the data record 230 is to be a member. Optimally, the centroids 251 are selected so that the clusters 231 will grow approximately evenly through even distribution of the data records 230.

The feature vectors 233 correspond to vectors of features extracted from the data records 230 to enable pairwise comparisons and similarity/distance computations. For example, each dimension in the feature vector 233 may correspond to a data column from the data record 230. The features may correspond to normalized versions of the data from the data records to speed pairwise comparisons. For example, when the data records 230 include a date within the past year, the data can be normalized or converted to an integer between 0 and 366 to represent the age of the data record 230. The normalized data may use fewer bits and/or may enable faster pairwise comparison.

The thresholds 236 may be manually established and/or automatically generated through machine learning to control the operation of the duplicate detection application 106. For example, the thresholds 236 may include a minimum confidence score or probability for a suspected duplicate to be acted upon or surfaced to a user for manual review. The thresholds 236 may define a maximum number of potential duplicate data records 230 to be surfaced at a time. The thresholds 236 may also define an age threshold beyond which duplicates are unlikely.

The manual review data 239 may record the outcomes of a manual review of potential duplicates. To this end, the manual review data 239 may indicate parameters associated with potential duplicates and whether a user confirmed or rejected the duplicate designation.

The machine learning models 242 may be used to learn which potential duplicates to surface to a user for manual review, as well as to learn how duplicate data records 230 may differ and yet remain duplicates. The machine learning models 242 may be trained based at least in part upon the outcomes of the manual review in the manual review data 239. Other aspects that may be suitable for machine learning include selection of centroids 251, determining the number of clusters 231, determining a number of multiple cluster 231 sets that should be generated to reduce missed duplicates, and so on.

The similarity ruleset 245 is employed by the duplicate detection application 106 to determine whether two feature vectors 233 are potential duplicates using a pairwise comparison. Various rules in the similarity ruleset 245 may be manually configured or generated automatically through machine learning. As a non-limiting example, the similarity ruleset 245 may indicate that a soundex algorithm should be employed to compare two name features that are pronounced the same rather than a strict alphanumeric string difference. Likewise, data indicating common typographical errors may be used to enhance similarity detection.

A centroid selection ruleset 248 is employed by the duplicate detection application 106 to determine the centroids 251 for the clusters 231. In one approach, the centroids 251 are randomly selected from the data records 230. In another approach, the centroids 251 are selected based at least in part on a difference of the data records 230. Where the data records 230 correspond to vendor invoices, the centroids 251 may be selected to be from different vendors. A goal in selecting the centroids 251 may be to approximately evenly distribute or cluster the data records 230 among the centroids 251. Various rules in the centroid selection ruleset 248 may be manually configured or generated automatically through machine learning.

The known non-duplicate data 249 indicates that particular data records 230 or data records 230 meeting certain criteria are not to be classified as duplicates. Some data records 230 may be known to recur legitimately and should not be considered duplicates. For instance, a vendor may provide a weekly service and submit an essentially identical invoice every week that differs only in the invoice date. The vendor's previous invoices should not be considered duplicates of a newly received invoice. The known non-duplicate data 249 may be created through manual establishment of criteria (e.g., excluding certain sources of data records 230, excluding data records 230 matching specified patterns, etc.). Alternatively, the known non-duplicate data 249 may be generated automatically as administrative users confirm data records 230 not to be duplicates through the manual review portal 227. In one implementation, the known non-duplicate data 249 is modeled using Markov chains.

The computing environment 205 may comprise, for example, a server computer or any other system providing computing capability. Alternatively, the computing environment 205 may employ a plurality of computing devices that may be arranged, for example, in one or more server banks or computer banks or other arrangements. Such computing devices may be located in a single installation or may be distributed among many different geographical locations. For example, the computing environment 205 may include a plurality of computing devices that together may comprise a hosted computing resource, a grid computing resource, and/or any other distributed computing arrangement. In some cases, the computing environment 205 may correspond to an elastic computing resource where the allotted capacity of processing, network, storage, or other computing-related resources may vary over time.

Various applications and/or other functionality may be executed in the computing environment 205 according to various embodiments. The components executed on the computing environment 205, for example, include a data record generation system 257, and other applications, services, processes, systems, engines, or functionality not discussed in detail herein. The data record generation system 257 is executed to generate data records 230 automatically or based upon user input and to submit the data records 230 for processing in the data store 212. For example, the data record generation system 257 may correspond to a vendor-based system for submitting an electronic invoice to the computing environment 203 via an application programming interface (API). Various services on the computing environment 203 may perform verifications on the data records 230 before they are processed by the data processing system 218, including the duplicate detection application 106. Alternatively, the data record generation system 257 may correspond to a client application through which a user manually submits an electronic invoice form, a contest entry form, a new customer creation form, a social network account creation form, and so on.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as an administration application 260 and/or other applications. The administration application 260 may be executed in a client device 206, for example, to access network content served up by the computing environment 203 and/or other servers, thereby rendering a user interface on the display. To this end, the administration application 260 may comprise, for example, a browser, a dedicated application, etc., and the user interface may comprise a network page, an application screen, etc. In particular, the administration application 260 may render user interfaces enabling a user to access the manual review portal 227 and to verify potential duplicates identified by the duplicate detection application 106. The client device 206 may be configured to execute applications beyond the administration application 260 such as, for example, email applications, social networking applications, word processors, spreadsheets, and/or other applications.

Figure 3:
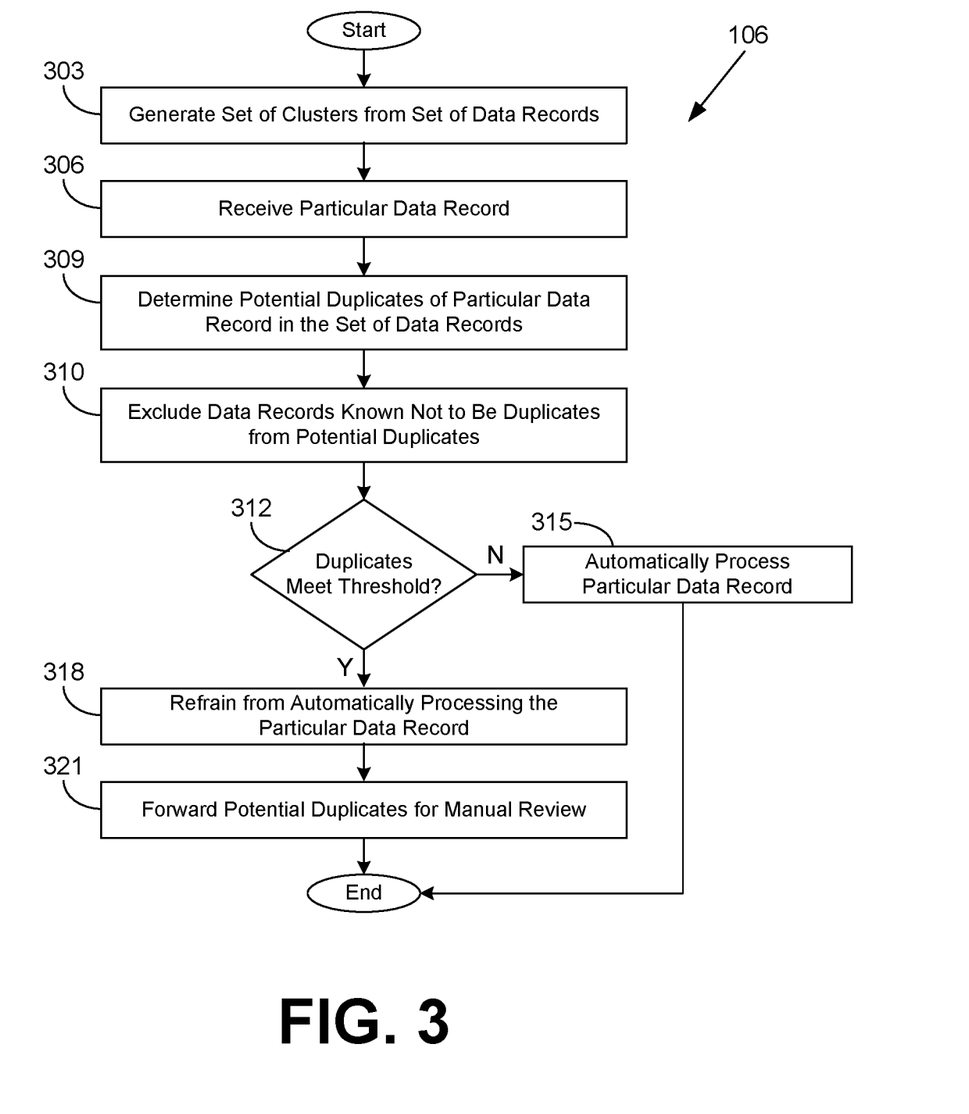
FIGS. 3-5 are flowcharts illustrating examples of functionality implemented as portions of a duplicate detection application executed in a computing environment in the networked environment of FIG. 2 according to various embodiments of the present disclosure.

Moving on to FIG. 3, shown is a flowchart that provides one example of the operation of a portion of the duplicate detection application 106 according to various embodiments. It is understood that the flowchart of FIG. 3 provides merely an example of the many different types of functional arrangements that may be employed to implement the operation of the portion of the duplicate detection application 106 as described herein. As an alternative, the flowchart of FIG. 3 may be viewed as depicting an example of elements of a method implemented in the computing environment 203 (FIG. 2) according to one or more embodiments.

Beginning with box 303, the duplicate detection application 106 generates a set of clusters 231 (FIG. 2) from the set of data records 230 (FIG. 2). This process is described in further detail with reference to the flowchart of FIG. 4 and the cluster generation service 221 (FIG. 2). This generation process may be performed as a batch process at a periodic time interval (e.g., hourly, daily, weekly, or at some other interval).

In box 306, the duplicate detection application 106 receives a particular data record 230. The particular data record 230 may be newly received or generated in the computing environment 203. The particular data record 230 may be received from a data record generation system 257 (FIG. 2) executed on a different computing environment 205 (FIG. 2).

In box 309, the duplicate detection application 106 determines a list of potential duplicates, if any, of the particular data record 230 within the set of data records 230 that have been grouped into the set of clusters 231. This process is described in further detail with reference to the flowchart of FIG. 4 and the real-time detection service 224 (FIG. 2). The potential duplicates may be determined in real-time or otherwise in response to receiving the particular data record in box 306.

In box 310, the duplicate detection application 106 excludes data records 230 that are known otherwise not to be duplicates from the set of potential duplicates. To this end, the duplicate detection application 106 may compare features of the particular data record 230 and/or of the identified potential duplicates with criteria generated from the known non-duplicate data 249 (FIG. 2). This action may exclude all potential duplicates in some cases.

In box 312, the duplicate detection application 106 determines whether the potential duplicates meet a threshold 236 for action. For example, a threshold 236 may specify a minimum confidence score (e.g., 90%) for a potential duplicate to be recognized as such and acted upon. Additionally, or alternatively, the duplicate detection application 106 may exclude potential duplicates from the list to limit to a threshold number of potential duplicate data records 230.

In box 315, if the duplicate detection application 106 determines that the potential duplicates determined by the real-time detection service 224 do not meet the configured thresholds 236, the duplicate detection application 106 causes the particular data record 230 to be automatically processed by the data processing system 218 (FIG. 2). In some implementations, the duplicate detection application 106 may cause the particular data record 230 to be added to a cluster 231 as a member 254 (FIG. 2) for future duplicate detection by the real-time detection service 224. As an example, where the particular data record 230 is an electronic invoice, the data processing system 218 may cause automated electronic payment to be made for the electronic invoice, subject to further verifications on the electronic invoice. Thereafter, the operation of the portion of the duplicate detection application 106 ends.

If the duplicate detection application 106 instead determines that the potential duplicates do meet the thresholds 236 or criteria, the duplicate detection application 106 moves from box 312 to box 318 and refrains from automatically processing the particular data record 230 via the data processing system 218. In the case of an electronic invoice, the data processing system 218 may refrain from automated electronic payment of the electronic invoice or take steps to interrupt or undo a pending or completed electronic payment. In some scenarios, the duplicate detection application 106 may take an affirmative step to reject the particular data record 230, such as in the case that the particular data record 230 meets a high confidence threshold 236 for being a duplicate.

In box 321, the duplicate detection application 106 forwards the particular data record 230 and the potential duplicates to an administrative user for manual review via the manual review portal 227 (FIG. 2). For example, the potential duplicates may be presented in a list form and prioritized by their corresponding probability of being a duplicate. The manual review portal 227 may generate a user interface highlighting the differences and/or similarities between the particular data record 230 and the potential duplicate data records 230. The manual review portal 227 may provide user interface components (e.g., buttons, links, etc.) for a user to confirm or reject the identification as a duplicate. These confirmations may be used in a machine learning model 242 (FIG. 2) to refine the process used by the duplicate detection application 106 to identify and surface potential duplicates. Also, a machine learning model 242 may be trained to identify data records 230 that are not duplicates, and the particular data record 230 and the potential duplicates may be run through this oppositely-trained machine learning model 242 in addition to or instead of manual review. Such an oppositely-trained machine learning model 242 would assist in reducing false duplicate matches. Thereafter, the operation of the portion of the duplicate detection application 106 ends.

Figure 4:
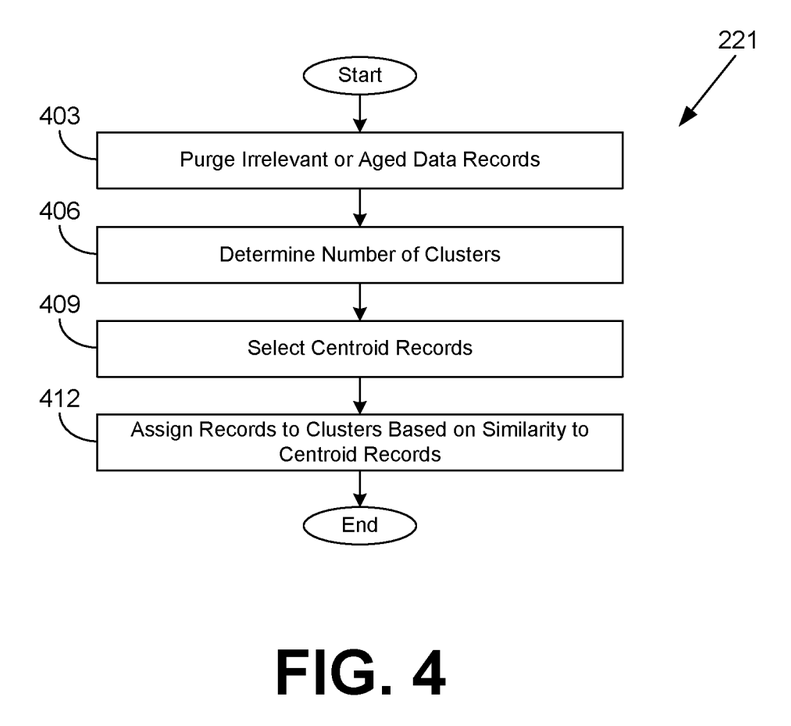

Turning now to FIG. 4, shown is a flowchart that provides one example of the operation of a portion of the cluster generation service 221 according to various embodiments. It is understood that the flowchart of FIG. 4 provides merely an example of the many different types of functional arrangements that may be employed to implement the operation of the portion of the cluster generation service 221 as described herein. As an alternative, the flowchart of FIG. 4 may be viewed as depicting an example of elements of a method implemented in the computing environment 203 (FIG. 2) according to one or more embodiments.

Beginning with box 403, the cluster generation service 221 purges irrelevant or aged data records 230 (FIG. 2) within a set of data records 230. For example, the cluster generation service 221 may exclude data records 230 that are older than a year or aged beyond another threshold 236 (FIG. 2). In one implementation, the data store 212 automatically performs this function.

In box 406, the cluster generation service 221 determines a number of clusters 231 (FIG. 2) to be generated. The number may be manually specified or automatically determined based at least in part on the number of data records 230, available processing resources or processing resource cost, accuracy targets, machine learning optimization, and/or other factors.

In box 409, the cluster generation service 221 selects a number of data records 230 corresponding to the number of clusters 231 from the set of data records 230 to be used as centroids 251 (FIG. 2) for the clusters 231. In one approach, the data records 230 may be selected at random to serve as centroids 251. In another approach, the data records 230 may be selected according to criteria designed to obtain diverse data records 230. Such criteria may be manually configured or automatically generated by a machine learning model 242 so that centroids 251 are generally selected in a way that approximately evenly distributes data records 230 to clusters 231.

In box 412, the cluster generation service 221 assigns the data records 230 to the clusters 231 based at least in part on the similarity of the data records 230 to the centroids 251 corresponding to the clusters 231. To this end, for a given data record 230, the cluster generation service 221 compares a feature vector 233 (FIG. 2) for the given data record 230 to feature vectors 233 of each one of the centroids 251, determining a similarity or distance measure between the respective pairs of feature vectors 233. In generating these similarity or distance measures, the cluster generation service 221 may ignore certain types of features or assign weights to certain types of features.

The cluster generation service 221 then determines which of the centroids 251 is most similar to the given data record 230. The given data record 230 is then assigned to or grouped in the most similar cluster 231 corresponding to the most similar cluster 231. The given data record 230 is then recorded as a member 254 (FIG. 2) of the cluster 231. This repeats until all data records 230 have been assigned to a respective cluster 231. Thereafter, the operation of the portion of the cluster generation service 221 ends.

Figure 5:
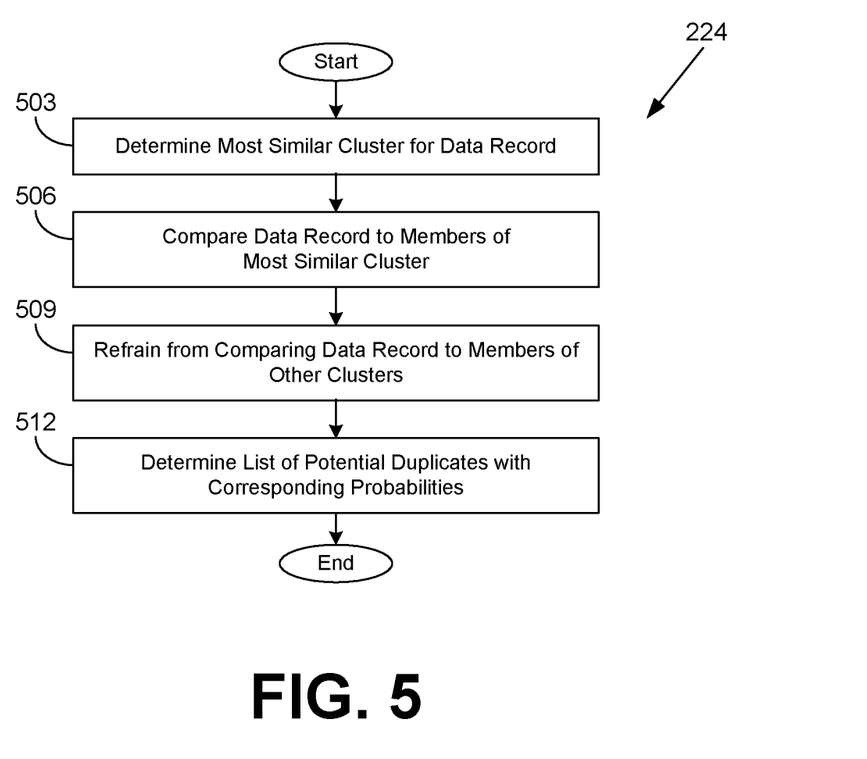

Continuing to FIG. 5, shown is a flowchart that provides one example of the operation of a portion of the real-time detection service 224 according to various embodiments. It is understood that the flowchart of FIG. 5 provides merely an example of the many different types of functional arrangements that may be employed to implement the operation of the portion of the real-time detection service 224 as described herein. As an alternative, the flowchart of FIG. 5 may be viewed as depicting an example of elements of a method implemented in the computing environment 203 (FIG. 2) according to one or more embodiments.

Beginning with box 503, the real-time detection service 224 determines a most similar cluster 231 (FIG. 2) for a particular data record 230 (FIG. 2). To this end, the real-time detection service 224 may compare the feature vector 233 (FIG. 2) of the particular data record 230 to the feature vectors 233 of the centroids 251 (FIG. 2) of the clusters 231, thereby determining similarity or distance measures. In generating these similarity or distance measures, the real-time detection service 224 may ignore certain types of features or assign weights to certain types of features. The centroid 251 having the feature vector 233 that is judged to be most similar to the feature vector 233 of the particular data record 230 is considered to correspond to the most similar cluster 231.

In some cases, similarity or distance measures between the feature vector 233 of the particular data record 230 and the feature vectors 233 of the centroids 251 may not meet a confidence threshold. That is to say, in some cases, the particular data record 230 may not be sufficiently similar to any of the clusters 231. In such cases, the most similar cluster 231 and additional similar clusters 231 may be selected for examination, where the number of additional similar clusters 231 may be based on how similar the particular data record 230 is to the centroid 251 of the most similar cluster 231.

In box 506, the real-time detection service 224 compares the particular data record 230 to each member 254 (FIG. 2) of the most similar cluster 231. For example, the real-time detection service 224 may perform a pairwise comparison between a feature vector 233 of the particular data record 230 and the respective feature vectors 233 of the members 254 of the most similar cluster 231. In performing the comparison, the output may be a similarity score, which may be translated into a confidence score or probability.

The similarity ruleset 245 (FIG. 2) may control how the similarity score is generated. For example, the similarity (or difference) between each pairwise feature may be computed, weighted, and summed to provide a total. The total may then be normalized for the number of features examined. Some features may be weighted more or less heavily than others. Differences in some features may be ignored, while similarities in other features may also be ignored. Particular combinations of features that are similar may be significant.

In box 509, the real-time detection service 224 refrains from comparing the particular data record 230 to members 254 of clusters 231 other than the most similar cluster 231. In this way, the real-time detection service 224 is able to search the data records 230 for potential duplicates of the particular data record 230 without having to perform a pairwise comparison for each and every data record 230.

In some situations, duplicate data records 230 may exist in the other clusters 231 and may be overlooked by the real-time detection service 224. Performing pairwise comparison of all of the data records 230 to identify any overlooked duplicates may be used to train a machine learning model 242 (FIG. 2) to adjust parameters relating to the similarity ruleset 245, the centroid selection ruleset 248, the thresholds 236 (FIG. 2), and/or other criteria used by the real-time detection service 224 and/or the cluster generation service 221 to improve accuracy. Also as discussed in connection with box 503, additional clusters 231 may be selected for examination in situations where the particular data record 230 is not sufficiently similar to any centroid 251.

In box 512, the real-time detection service 224 determines a list of potential duplicate data records 230 with corresponding probabilities as to whether the data records 230 are actual duplicates of the particular data record 230. The list may be filtered to exclude potential duplicates with probabilities below a particular threshold 236. The list may also be filtered to exclude potential duplicates having relatively lower corresponding probabilities where the list is limited to a particular number of duplicates specified by the threshold 236. In addition, the particular data record 230 may be added as a member 254 of the most similar cluster 231 to facilitate subsequent duplicate detection in real-time until the next time the clusters 231 are regenerated. Thereafter, the operation of the portion of the real-time detection service 224 ends.

In some implementations, to improve accuracy and reduce overlooked duplicates, multiple sets of clusters 231 having differently selected centroids 251 may be generated for the same data records 230. The real-time detection service 224 will then identify the most similar cluster 231 for each set of clusters 231, and perform pairwise comparisons in each of the most similar clusters 231. In other implementations, the real-time detection service 224 may perform pairwise comparisons for members 254 of the top N clusters 231 as determined based on similarity.

Figure 6:
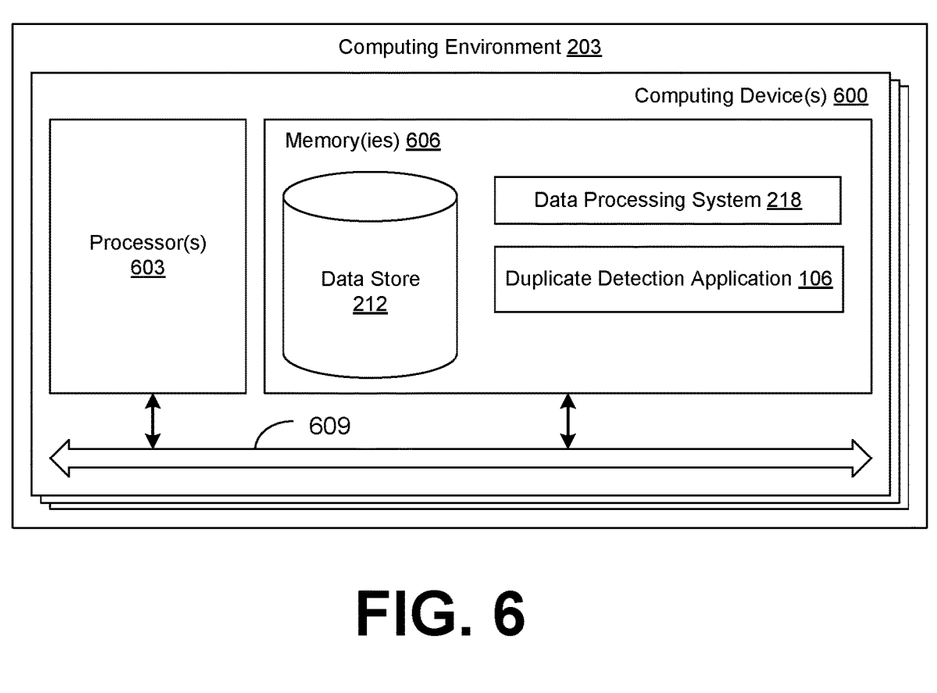
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the duplicate detection application 106, the data processing system 218, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the duplicate detection application 106, the data processing system 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the duplicate detection application 106. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the duplicate detection application 106 and the data processing system 218, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the duplicate detection application 106 and the data processing system 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   randomly selecting, by at least one computing device, N electronic invoices from a set of electronic invoices;
   extracting, by the at least one computing device, a respective feature vector for each electronic invoice in the set of electronic invoices;
   assigning, by the at least one computing device, each respective electronic invoice in the set of electronic invoices to an individual cluster of a set of N clusters by determining to which of the N electronic invoices the respective electronic invoice is most similar;
   receiving, by the at least one computing device, a particular electronic invoice; and
   in response to receiving the particular electronic invoice and in real-time:
      assigning, by the at least one computing device, the particular electronic invoice to a most similar cluster of the set of N clusters by determining to which of the N electronic invoices the particular electronic invoice is most similar;
      determining, by the at least one computing device, whether each electronic invoice in the most similar cluster is a potential duplicate of the particular electronic invoice; and
      forwarding, by the at least one computing device, one or more potential duplicate electronic invoices for a manual review.

2. The method of claim 1, further comprising bypassing, by the at least one computing device, an examination of electronic invoices other than those in the most similar cluster or the N electronic invoices as being potential duplicates of the particular electronic invoice.

3. A system, comprising:
   at least one computing device; and
   a duplicate detection application executable in the at least one computing device, wherein when executed the duplicate detection application causes the at least one computing device to at least:
      generate a set of clusters from a set of data records by grouping each data record in the set of data records according to similarity to respective centroid data records of the set of clusters, the respective centroid data records being selected according to a centroid selection ruleset to approximately evenly distribute the set of data records among the set of clusters; and determine whether a particular data record has a potential duplicate in the set of data records by:
comparing the particular data record to the respective centroid data records to identify a most similar cluster in the set of clusters; and
comparing the particular data record to each data record in the most similar cluster.

4. The system of claim 3, wherein when executed the duplicate detection application further causes the at least one computing device to at least generate a list of potential duplicates of the particular data record in the set of data records, the list of potential duplicates indicating a corresponding probability for each potential duplicate data record.

5. The system of claim 4, wherein when executed the duplicate detection application further causes the at least one computing device to at least:
exclude one or more data records from the list of potential duplicates based at least in part on the corresponding probabilities; and
cause the list of potential duplicates excluding the one or more data records to be presented for a manual review.

6. The system of claim 5, wherein when executed the duplicate detection application further causes the at least one computing device to at least train a machine learning model to adjust a probability threshold for excluding the one or more data records based at least in part on a user confirmation in the manual review.

7. The system of claim 3, wherein when executed the duplicate detection application further causes the at least one computing device to at least queue the particular data record for an automated processing in response to determining that the particular data record does not have the potential duplicate in the set of data records.

8. The system of claim 7, wherein the data record corresponds to an electronic invoice and the automated processing comprises an automated electronic payment of the electronic invoice.

9. The system of claim 3, wherein when executed the duplicate detection application further causes the at least one computing device to at least:
receive the particular data record; and
determine whether the particular data record has the potential duplicate in the set of data records in real-time responsive to receiving the particular data record.

10. The system of claim 3, wherein when executed the duplicate detection application further causes the at least one computing device to at least:
determine a quantity N of clusters to be generated for the set of clusters; and
randomly select N data records from the set of clusters according to the centroid selection ruleset to serve as the respective centroid data records.

11. A system, comprising:
at least one computing device; and
a duplicate detection application executable in the at least one computing device, wherein when executed the duplicate detection application causes the at least one computing device to at least:
generate a set of clusters from a set of data records by grouping each data record in the set of data records according to similarity to respective centroid data records of the set of clusters;
extract a respective feature vector for each data record in the set of data records; and
determine whether a particular data record has a potential duplicate in the set of data records by:
comparing the particular data record to the respective centroid data records to identify a most similar cluster in the set of clusters; and
comparing the particular data record to each data record in the most similar cluster.

12. The system of claim 11, wherein generating the set of clusters further comprises:
for each individual data record in the set of data records:
computing distance measures between the respective feature vector of the individual data record and the respective feature vectors of the respective centroid data records; and
assigning the individual data record to a particular cluster in the set of clusters according to which one of the respective centroid data records is associated with a minimal distance measure.

13. The system of claim 11, wherein comparing the particular data record to each data record in the most similar cluster includes performing a pairwise comparison between a particular feature vector of the particular data record and the respective feature vector for each data record in the most similar cluster.

14. The system of claim 11, wherein comparing the particular data record to the respective centroid data records includes computing a distance measure between a particular feature vector of the particular data record and the respective feature vector for each of the respective centroid data records, and the most similar cluster is associated with a minimal distance measure corresponding to the respective centroid data record.

15. The system of claim 3, wherein when executed the duplicate detection application further causes the at least one computing device to at least determine that the particular data record does not have the potential duplicate in the set of data records based at least in part on data indicating known non-duplicate data records.

16. The system of claim 3, wherein when executed the duplicate detection application further causes the at least one computing device to at least generate a plurality of sets of clusters for the set of data records, wherein each data record in the set of data records is assigned to a single cluster in each set of clusters.

17. The method of claim 1, wherein the N electronic invoices correspond to centroid electronic invoices that are randomly selected according to a centroid selection ruleset.

18. The method of claim 1, wherein assigning each respective electronic invoice in the set of electronic invoices to the individual cluster of the set of N clusters further comprises:
for each respective electronic invoice in the set of electronic invoices:
computing distance measures between the respective feature vector of the respective electronic invoice and the respective feature vectors of the respective N electronic invoices; and
assigning the respective electronic invoice to the most similar cluster in the set of N clusters according to which one of the respective N electronic invoices is associated with a minimal distance measure.

19. The method of claim 1, further comprising performing a pairwise comparison between a particular feature vector of the respective electronic invoice and the respective feature vector for each electronic invoice in the most similar cluster.

20. The method of claim 1, further comprising:
determining the one or more potential duplicate electronic invoices to be forwarded for the manual review based at least in part on a machine learning model;

recording, by the at least one computing device, one or more outcomes from the manual review; and training, by the at least one computing device, the machine learning model based at least in part on the one or more outcomes from the manual review.

\* \* \* \* \*